United States Patent
Graesser

(10) Patent No.: US 8,351,686 B2
(45) Date of Patent: Jan. 8, 2013

(54) METHODS AND SYSTEMS FOR DETERMINING ANGLES AND LOCATIONS OF POINTS

(75) Inventor: Christian Graesser, Vallentuna (SE)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/143,320

(22) PCT Filed: Jan. 8, 2010

(86) PCT No.: PCT/US2010/020428
§ 371 (c)(1),
(2), (4) Date: Sep. 28, 2011

(87) PCT Pub. No.: WO2010/080950
PCT Pub. Date: Jul. 15, 2010

(65) Prior Publication Data
US 2012/0013736 A1    Jan. 19, 2012

Related U.S. Application Data

(60) Provisional application No. 61/143,361, filed on Jan. 8, 2009.

(51) Int. Cl.
*G06K 9/00* (2006.01)
(52) U.S. Cl. .......... 382/154; 382/106; 348/142
(58) Field of Classification Search .......... None
See application file for complete search history.

(56) References Cited

U.S. PATENT DOCUMENTS

| | | | |
|---|---|---|---|
| 5,642,285 A | 6/1997 | Woo et al. | |
| 5,825,412 A | 10/1998 | Hobson et al. | |
| 6,147,598 A | 11/2000 | Murphy et al. | |
| 6,282,362 B1 | 8/2001 | Murphy et al. | |
| 6,346,980 B1 | 2/2002 | Tani et al. | |
| 7,075,661 B2 | 7/2006 | Petty et al. | |
| 7,184,088 B1 * | 2/2007 | Ball | 348/348 |

(Continued)

FOREIGN PATENT DOCUMENTS

DE    19922321 C2    7/2008
(Continued)

OTHER PUBLICATIONS

M. Pollefeys; D. Nister; J.M. Frahm; A. Akbarzadeh, . . . and H. Towles, "Detailed Real-Time Urban 3D Reconstruction from Video", Oct. 20, 2007, Springer Science+Business Media, LLC 2007, pp. 143-167.*

(Continued)

*Primary Examiner* — Andrew W Johns
*Assistant Examiner* — Siamak Harandi
(74) *Attorney, Agent, or Firm* — Kilpatrick Townsend & Stockton LLP

(57) ABSTRACT

An apparatus for determining an azimuth of a target point is provided. The apparatus includes a support structure and an imaging device coupled to the support structure and configured to provide image data. The apparatus also includes a position measuring device coupled to the support structure and configured to determine position information and a processor in electrical communication with the imaging device and the position measuring device. The processor is configured to receive the image data from the imaging device, receive the position information from the position measuring device, determine a baseline between a first position and a second position, determine an orientation between overlapping images, and compute the azimuth of the target point relative to the baseline.

19 Claims, 13 Drawing Sheets

U.S. PATENT DOCUMENTS

| | | | |
|---|---|---|---|
| 7,339,611 B2 | 3/2008 | Marold et al. | |
| 7,541,974 B2 | 6/2009 | Scherzinger | |
| 7,619,561 B2 | 11/2009 | Scherzinger | |
| 7,697,127 B2 | 4/2010 | Vogel et al. | |
| 7,719,467 B2 | 5/2010 | Norda et al. | |
| 2004/0051711 A1* | 3/2004 | Dimsdale et al. | 345/419 |
| 2005/0125142 A1 | 6/2005 | Yamane | |
| 2007/0008515 A1 | 1/2007 | Otani et al. | |
| 2007/0127816 A1 | 6/2007 | Balslev et al. | |
| 2007/0263924 A1* | 11/2007 | Kochi et al. | 382/154 |
| 2007/0288197 A1 | 12/2007 | Martin | |
| 2008/0129824 A1 | 6/2008 | Loveless | |
| 2009/0138233 A1 | 5/2009 | Kludas et al. | |
| 2009/0220144 A1 | 9/2009 | Mein et al. | |
| 2009/0262974 A1 | 10/2009 | Lithopoulos | |
| 2010/0141759 A1 | 6/2010 | Scherzinger | |
| 2010/0172546 A1 | 7/2010 | Sharp | |
| 2010/0174507 A1 | 7/2010 | Vogel et al. | |

FOREIGN PATENT DOCUMENTS

| | | |
|---|---|---|
| EP | 1936323 A2 | 6/2008 |
| EP | 1944572 A1 | 7/2008 |
| WO | WO 2005/059473 A3 | 6/2005 |
| WO | WO 2007/031248 A2 | 3/2007 |
| WO | WO 2009/100773 A1 | 8/2009 |
| WO | WO 2009/100774 A1 | 8/2009 |
| WO | WO 2009/103342 A1 | 8/2009 |
| WO | WO 2009/106136 A1 | 9/2009 |
| WO | WO 2009/106141 A1 | 9/2009 |
| WO | WO 2010/080950 A1 | 7/2010 |

OTHER PUBLICATIONS

International Search Report and Written Opinion for PCT Patent Application No. PCT/US2010/020428 mailed on Mar. 17, 2010, 10 pages.

Albertz, J., "Albrecht Meydenbauer—Pioneer of Photogrammetric Documentation of the Cultural Heritage" Proceedings 18$^{th}$ International Symposium CIPA 2001, Potsdam Germany, Sep. 18-21, 2001, pp. 19-25.

Bouguet, J., "Pyramidal Implementation of the Lucas Kanade Feature Tracker Description of the Algorithm", Intel Corporation, Microprocessor Research Labs, 2000, pp. 1-9.

Capel, D., "Image Mosaicing and Super-resolution", Robotics Research Group, Department of Engineering, University of Oxford, Trinity Term, 2001, 269 pages.

Engels, C., et al., "Bundle Adjustment Rules", Photogrammetric Computer Vision (PSV), International Society for Photogrammetry and Remote Sensing (ISPRS), Sep. 2006, 6 pages.

Gruen, A., et al., "Calibration and Orientation of Cameras in Computer Vision, Chapter 4—Fraser, Photogrammetric Camera Component Calibration: A Review of Analytical Techniques", 2001, pp. 95-121, Springer-Verlag, Berlin Heidelberg, Germany.

Harris, C., et al., "A Combined Corner and Edge Detector" 1988, Plessey Research Roke Manor, United Kingdom, The Plessey Company plc., pp. 147-151.

Hartley, R., et al., "Multiple View Geometry in Computer Vision, Second Edition, Chapter 18, N-View Computational Methods", 2000, Cambridge University Press, United Kingdom, pp. 434-457.

Heckbert, P., "Fundamentals of Texture Mapping and Image Warping", Master's Thesis, University of California, Berkeley, Dept. of Electrical Engineering and Computer Science, Jun. 17, 1989, 94 pages.

Nister, D., et al., "What Do Four Points in Two Calibrated Images Tell us About the Epipoles?", European Conference on Computer Vision, 2004, Springer-Verlag, 15 pages.

Photo Towers, Professional Camera Support, Tall Tripods, Retrieved from http://www.photo-towers.com/tall-tripods.htm on Sep. 6, 2011, 1 page.

Shum, H., et al., "Construction of Panoramic Image Mosaics with Global and Local Alignment", International Journal of Computer Vision (IJCV), May 1998, vol. 48, pp. 1-48.

Stein, G.P., "Accurate Internal Camera Calibration Using Rotation, with Analysis of Sources of Error", 1995, pp. 230-236.

Stone, H., et al., "A Fast Direct Fourier-Based Algorithm for Subpixel Registration of Images", IEEE Transactions on Geoscience and Remote Sensing, vol. 39, No. 10, Oct. 2001, pp. 2235-2243.

Stricker, D., et al., "Real-Time and Markerless Vision-Based Tracking for Outdoor Augmented Reality Applications", Proceedings of the IEEE and ACM International Symposium on Augmented Reality (ISAR'01), 2001, 2 pages.

Szeliski, R., "Image Alignment and Stitching: A Tutorial", Foundations and Trends® in Computer Graphic and Vision, 2006, vol. 2, No. 1, 105 pages.

Szeliski, R., "Image Alignment and Stitching: A Tutorial", Preliminary Draft Jan. 26, 2005, Technical Report, MSR-TR-2004-92, 71 pages. Available at URL: http://robots.stanford.edu/cs223b05/MSR-TR-2004-92-Jan26.pdf.

Szeliski, R., "Video Mosaics for Virtual Environments", IEEE Computer Graphics and Applications, vol. 16, No. 2, Mar. 1996, pp. 22-30.

Tsai, R, "An Efficient and Accurate Camera Calibration Technique for 3D Machine Vision", IEEE Computer Society Conference on Computer Vision and Pattern Recognition, Jun. 22-26, 1986, Miami Beach, Florida, pp. 364-437.

Tsai, R., "Synopsis of Recent Progress on Camera Calibration for 3D Machine Vision", The Robotics Review 1, 1989, The MIT Press, pp. 147-159.

Pedershine et al., "Multi-camera parameter tracking," Feb. 2001, IEE Proc. Vis. Image Signal Process., vol. 148, No. 1 pp. 70-77.

Non-Final Office Action of Jun. 25, 2012 for U.S. Appl. No. 12/616,673, 27 pages.

* cited by examiner

METHODS AND SYSTEMS FOR DETERMINING ANGLES AND LOCATIONS OF POINTS

CROSS-REFERENCES TO RELATED APPLICATIONS

This application is a U.S. National Stage of PCT Application No. PCT/US 2010/020428, filed Jan. 8, 2010, claims priority to U.S. Provisional Application No. 61/143,361, filed Jan. 8, 2009, the disclosures of which incorporated herein by reference in their entirety for all purposes.

FIELD OF THE INVENTION

The present invention relates generally to methods and systems for determining angles and locations of target points. Merely by way of example, embodiments of the present invention provide methods for determining angles and locations of target points using images. Such embodiments may be used, for example, in surveying applications. However, embodiments of the present invention are not limited to this particular application and may be utilized in a variety of measurement systems.

BACKGROUND

The art of surveying involves the determination of unknown positions using measurements of angles and distances. For example, in some surveying operations horizontal and vertical angles and distance are measured between a reference point and a target point.

In other surveying operations, horizontal and vertical angles are measured between a reference point and a target point from more than one position. In either case, the measured data may be used to calculate the location of the target point.

A theodolite is a surveying instrument that is commonly used to measure horizontal and vertical angles. A theodolite typically includes a telescope mounted so that it rotates about horizontal and vertical axes. A theodolite may include circular scales that are used in measuring the angular position of the telescope. The horizontal angle (i.e. yaw) and the vertical angle (i.e. pitch) are read from the circular scales to determine the yaw of the target with respect to a reference position and the pitch of the target with respect to the local gravity vector. Some modern electronic theodolites utilize angle encoders instead of scales to automate angular measurements.

Theodolites frequently include electronic distance measurement (EDM) units to measure the distance from the theodolite to the target. Such integrated systems are commonly referred to as total stations. Total stations generally include a computer or control unit for controlling the measurements and for storing measurement data.

Despite the utility of theodolites and total stations, improved methods and systems for determining angles and locations of points are desired.

SUMMARY

The present invention provides improved methods and systems for determining angles and/or locations of target points. Merely by way of example, embodiments of the invention provide methods for determining angles and locations of target points using images. Embodiments may be used, for example, in surveying applications. However, embodiments of the present invention are not limited to this particular application and may be utilized in a variety of measurement systems.

According to an embodiment of the present invention, an apparatus for determining an azimuth of a target point includes a support structure and an imaging device coupled to the support structure and configured to provide image data. The apparatus also includes a position measuring device coupled to the support structure and configured to determine position information and a processor in electrical communication with the imaging device and the position measuring device. The processor is configured to receive the image data from the imaging device, receive the position information from the position measuring device, determine a baseline between a first position and a second position, determine an orientation between overlapping images, and compute the azimuth of the target point relative to the baseline.

According to another embodiment of the present invention, a method of determining an azimuth of a target point includes positioning an imaging device at a first location, orienting the imaging device with respect to a reference position, obtaining a first image of a surface from the first location, and determining a position of the first location. The method also includes orienting the imaging device with respect to the target point, obtaining a second image of the surface from the first location where a portion of the first image overlaps a portion of the second image, determining an orientation of the first image relative to the second image, and determining the azimuth of the target point relative to the reference position.

According to another embodiment of the present invention, a method of determining coordinates of a target point in a local coordinate frame includes computing a baseline as a function of a first location and a second location, obtaining a first image of a surface from the second location using an imaging device, and orienting the first image relative to the baseline. The method also includes aligning the imaging device with the target point, obtaining a second image of the surface from the second location with the imaging device aligned with the target point, and determining an orientation of the second image relative to the first image. The method also includes computing the azimuth of the target point, determining a distance from the second location to the target point, and computing the coordinates of the target point in the local coordinate frame.

According to yet another embodiment of the present invention, a method of determining coordinates in a local coordinate frame of a target point on a substantially flat surface includes obtaining a first image of a surface from a first location using a calibrated imaging device and determining a position of the first location in the local coordinate frame. The method also includes obtaining a second image of the substantially flat surface from a second location using the calibrated imaging device where the second image includes the target point. The first location is different from the second location, and a portion of the first image overlaps a portion of the second image. The method also includes determining a position of the second location in the local coordinate frame, computing an azimuth of the second image, and computing the coordinates of the target point in the local coordinate frame.

Numerous benefits can be realized using embodiments of the present invention over conventional techniques. For example, an embodiment according to the present invention provides an inexpensive apparatus for measuring angles and locations of target points. In a particular embodiment, a relatively small and inexpensive apparatus is provided that does not require expensive scales or encoders to measure horizontal angles. Instead, horizontal angles can be measured using the relative orientation between overlapping images. Also, the location or coordinates of target points both within and outside the images can be determined. As explained more fully below, the location of target points within the images that are on a substantially flat surface being imaged can be determined using a calibrated imaging device. The location of target points outside the images can be determined using horizontal angles with the distance and vertical angle of the distance measuring device.

Depending upon the embodiment, one or more of these benefits may exist. These and other benefits are described throughout the specification and more particularly below.

DETAILED DESCRIPTION

Embodiments of the present invention provide methods and systems for determining angles and/or locations of target points. In a particular embodiment, the relative orientation between overlapping images can be used to determine the horizontal angle, or azimuth, of a target point with respect to a reference location. In some embodiments, the images can also be used to determine the location, or coordinates, of target points located on substantially flat surfaces within the images. As with a conventional theodolite, constraints can be applied which allow the locations to be related to a real world coordinate system (e.g., a local coordinate frame). In other embodiments, the distance between a measurement position and a target point and the vertical angle of the distance measuring device can be used to determine the locations of points outside the images. These and other embodiments of the present invention are described more fully below.

Figure 1:
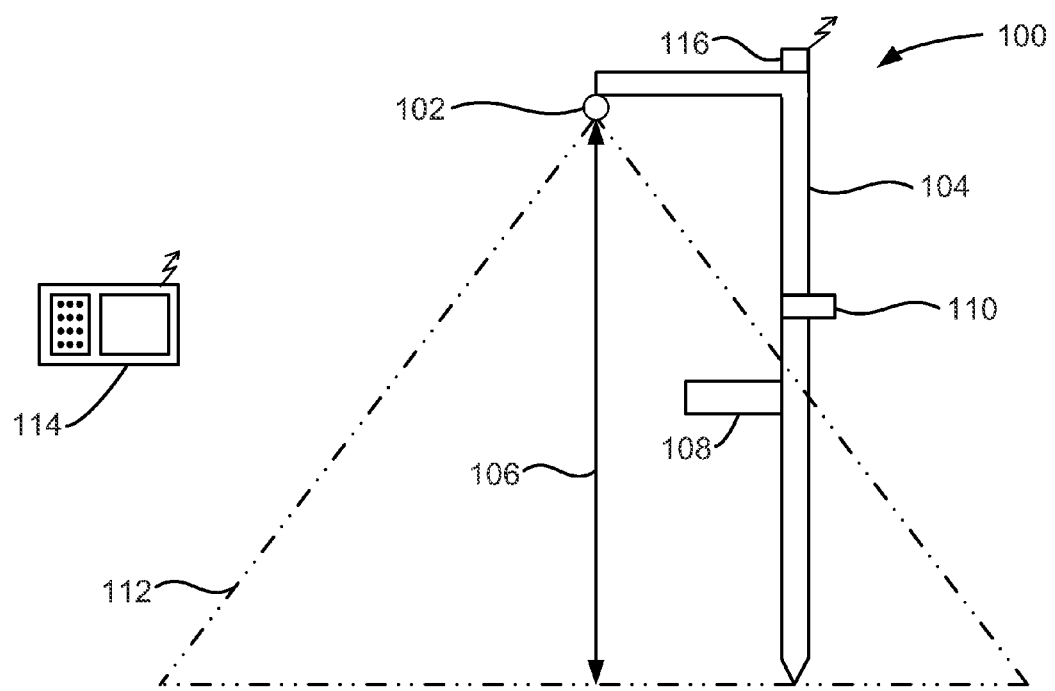
FIG. 1 is a simplified diagram of an apparatus for determining angles and/or locations of target points according to an embodiment of the present invention.

FIG. 1 is a simplified diagram of an apparatus for determining angles and/or locations of target points according to an embodiment of the present invention. As shown in FIG. 1, a measurement apparatus 100 includes an imaging device 102. The imaging device 102 may be a digital camera or other suitable device that is capable of capturing images using an image sensor. The image sensor typically includes a predetermined number of photosensitive elements arranged in an array. For example, the image sensor may be a two-dimensional array of elements capable of generating image information from optical signals impinging on the elements. The number of pixels in the image generally corresponds to the number of elements in the array. The array may be a charge-coupled device (CCD) or a complimentary metal-oxide-semiconductor (CMOS) image sensor array. Other suitable arrays containing photosensitive elements are also included within the scope of the present invention.

Merely by way of example, a two megapixel array having 1600×1200 sensor elements may be used in an embodiment of the invention. In some embodiments, the imaging device 102 utilizes a wide-angle lens to increase the field of view (FOV) 112 of the imaging device 102 and of the images obtained using the imaging device 102. For example, a particular embodiment may use a catadioptric rectilinear wide-angle lens with a diagonal field of view of 151.8°. Such a lens is available from Nanophotonics Co., Ltd. of South Korea. One of skill in the art will appreciate that there are a variety of wide-angle lenses suitable for use with the imaging device 102 of the present invention.

Some embodiments of the present invention utilize a calibrated imaging device. The calibration may include an interior and exterior calibration. The purpose of the interior calibration is to determine the angular relationship between each element of the image sensor and the angle of the optical signal entering the imaging device and impinging on the element. The interior calibration can also correct for optic distortion. Essentially, the calibration provides a mapping between each of the image sensor elements and the angle of the rays entering the imaging device and impinging on the element. The calibration process can be performed according to known techniques. Once the angular relationships have been determined, they can be associated with the pixels, or elements, of the images produced by the image sensor.

The purpose of the exterior calibration is to determine the relationship between the imaging device and the support structure in a support structure coordinate frame. The exterior calibration may include an offset vector and three rotation angles of the imaging device in the support structure coordinate frame. Coordinates in the support structure coordinate frame may be transformed to coordinates in the local coordinate frame in accordance with known techniques.

The exterior calibration may also include the relationship between the tilt sensor and the electronic distance measurement (EDM) unit in the support structure coordinate frame. The tilt sensor and EDM are discussed more fully below.

As shown in FIG. 1, the imaging device 102 is coupled to a support structure 104. The support structure 104 may be a surveyor's pole, a tripod, or a similar structure suitable for supporting the imaging device 102. In an embodiment of the present invention, the imaging device 102 is coupled to the support structure 104 at a known height 106 above the surface being imaged.

Some embodiments of the present invention also include a tilt sensor 110 coupled to the support structure 104. The tilt sensor 110 may be a bubble level, an electronic tilt sensor, or other suitable device capable of determining the vertical alignment of the support structure 104 and of the imaging device 102 relative to the local gravity vector. The tilt sensor 110 may include a two-axis tilt sensor and a compass to determine the magnitude and direction of tilt relative to the local gravity vector and magnetic north. The magnitude and direction can be used to determine the location of the imaging device 102 and the location of the tip of the support structure 104.

Some embodiments of the present invention also include a distance measuring device 108 coupled to the support structure 104. The distance measuring device 108 may be an EDM unit and may include a laser pointer to highlight target points. Some embodiments utilize a visible laser for this application. Other embodiments utilize an invisible laser with a telecamera and display to direct the EDM to the target point. Yet other embodiments utilize an optical/mechanical sighting device or a graphic display of crosshairs or other symbols to identify the target points. In some embodiments, the distance measuring device 108 includes a vertical angle sensor or other suitable device capable of determining the vertical angle of the distance measuring device 108 relative to the support structure 104. The distance measuring device 108 may be used to determine the distance to target points.

The position of measurement apparatus in the local coordinate frame may be determined using a reflective target (not shown) coupled to the support structure 104 and a total station (not shown) in accordance with known techniques.

The components coupled to the support structure 104, such as the imaging device 102, the tilt sensor 110, and the distance measuring device 108, may be in communication with a computing device 114. The computing device 114 may communicate directly with each individual component to send and/or receive data, or the communications may be through an intermediate communications device 116 as illustrated in FIG. 1. The communications may be via wired or wireless connections. Computing device 114 may be a handheld device as shown in FIG. 1, or any other computing device suitable for sending and/or receiving data and performing computations to determine the angles and/or locations of target points. Computing device 114 typically includes memory for storing data and a processor for performing computations.

In FIG. 1 the field of view (FOV) 112 of the imaging device 102 is generally downward and includes the area surrounding the bottom of the support structure 104. Such an orientation of the imaging device 102 is not required by embodiments of the present invention, however, and other embodiments include different orientations and thus a different FOV.

Figure 2A:
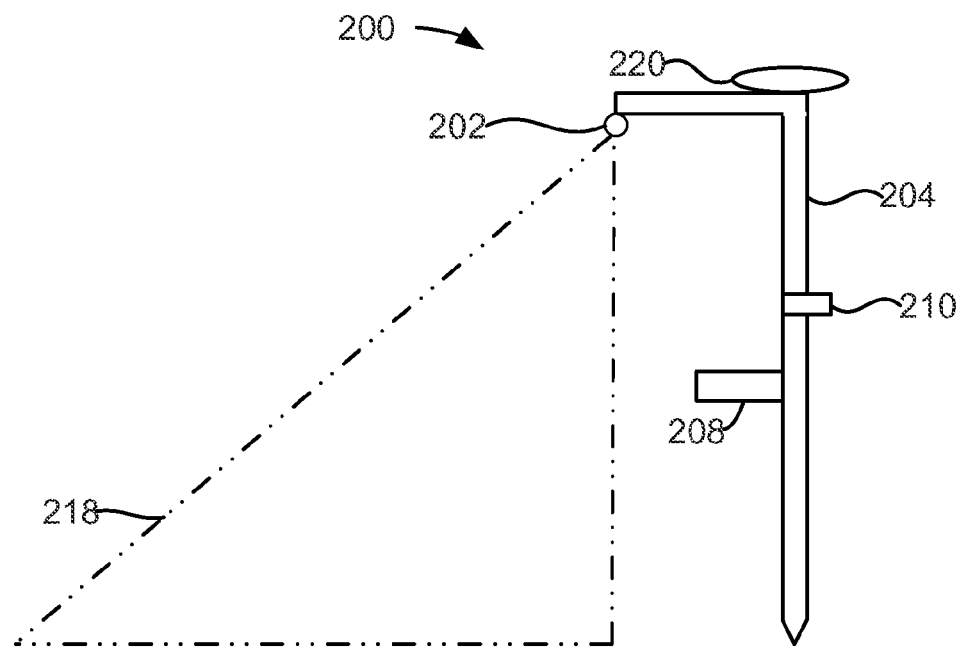
FIGS. 2A-2C are simplified diagrams of an apparatus for determining angles and/or locations of target points according to other embodiments of the present invention.

FIG. 2A is a simplified diagram of an apparatus for determining angles and/or locations of target points according to another embodiment of the present invention. The measurement apparatus 200 illustrated in FIG. 2A shares common components with the measurement apparatus 100 illustrated in FIG. 1, and the description provided above in relation to FIG. 1 may be applicable to FIG. 2A. For example, measurement apparatus 200 may include an imaging device 202, a support structure 204, a tilt sensor 210, and a distance measuring device 208, each of which are similar to the corresponding components described above in relation to FIG. 1.

As shown in FIG. 2A, some embodiments of the present invention also include a position measuring device 220 coupled to the support structure 204. The position measuring device 220 may include a global navigation satellite system (GNSS) such as a global positioning system (GPS) or other suitable device that is capable of determining a position of the position measuring device 220 in the local coordinate frame. Additionally, in some embodiments the measurement apparatus 200 illustrated in FIG. 2A may be in communication with a computing device such as the computing device 114 illustrated in FIG. 1. One of ordinary skill in the art would recognize many variations, modifications, and alternatives suitable for determining the position of the measurement apparatus 200.

In some embodiments the tilt sensor 210 may include a compass or device capable of determining the magnitude and direction of tilt relative to the local gravity vector and magnetic north when the support structure is not leveled. The tilt sensor 210 can be used with the position measuring device 220 to determine the location of the imaging device 202 in the local coordinate frame.

In FIG. 2A, the FOV 218 of the imaging device 202 is generally forward and downward. Here forward is defined as being away from the support structure 204. As explained above, however, such an orientation of the imaging device 202 is not required by embodiments of the present invention. Other embodiments may include different orientations and thus a different FOV.

Figure 2B:
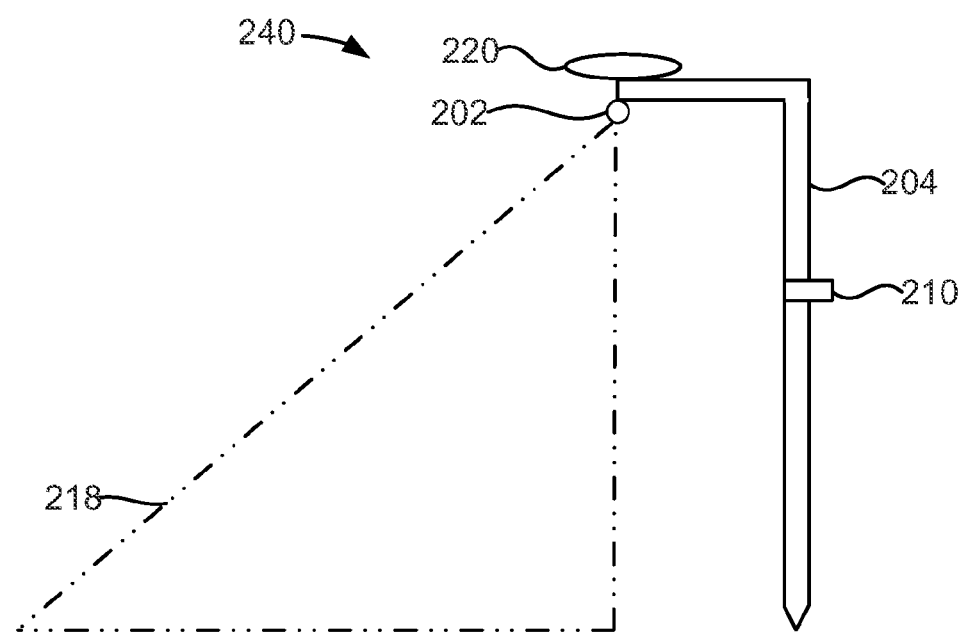

FIG. 2B is a simplified diagram of an apparatus for determining angles and/or locations of target points according to another embodiment of the present invention. The measurement apparatus 240 illustrated in FIG. 2B is similar to the measurement apparatus 200 illustrated in FIG. 2A. In FIG. 2B, however, the position measuring device 220 is positioned above the imaging device 202. The imaging device 202 and the position measuring device 220 can be arranged such that the optical center of the imaging device 202 and the antenna phase center of the position measuring device 220 are aligned along a vertical axis. Thus, when the support structure 204 is leveled, or aligned with the local gravity vector, the optical center of the imaging device 202 is offset from the antenna phase center of the position measuring device 220 by a fixed vertical distance.

Figure 2C:
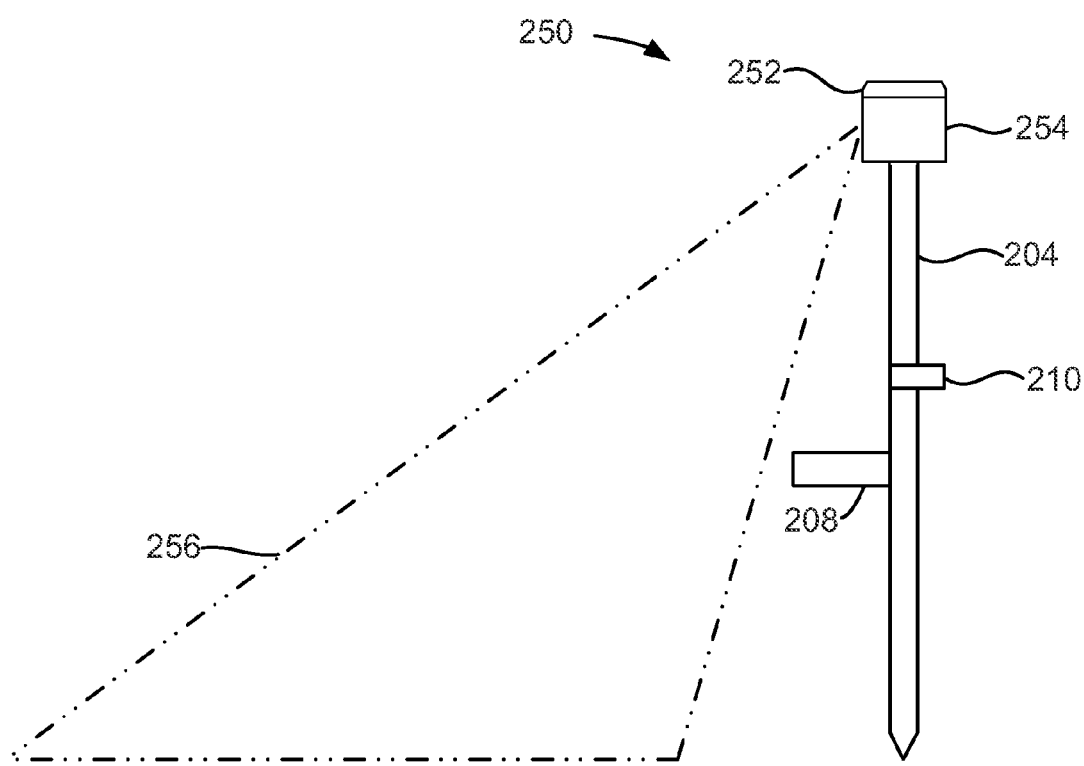

FIG. 2C is a simplified diagram of an apparatus for determining angles and/or locations of target points according to another embodiment of the present invention. The measurement apparatus 250 illustrated in FIG. 2C is similar to the measurement apparatus 200 illustrated in FIG. 2A and measurement apparatus 240 illustrated in FIG. 2B. Measurement apparatus 250, however, includes a position measuring device 252 coupled to an imaging device 254. Alternatively, the position measuring device 252 may be integrated with the imaging device 254. In either embodiment, both the position measuring device 252 and the imaging device 254 can be aligned with a vertical axis of the support structure 204. The imaging device 254 and the position measuring device 252 can be arranged such that when the support structure 204 is leveled, the optical center of the imaging device 254 and the antenna phase center of the position measuring device 252 are aligned with the local gravity vector and offset by a fixed vertical distance.

FIG. 2C also illustrates an embodiment where the FOV 256 of the imaging device 254 is directed downward and away from the support structure 204. By directing the FOV 256 away from the support structure 204, the distance measuring device 208 and the tilt sensor 210 do not interfere with the surface being imaged. The FOV 256 is not limited by this particular orientation, however, and other embodiments may include different orientations and thus a different FOV.

Figure 3A:
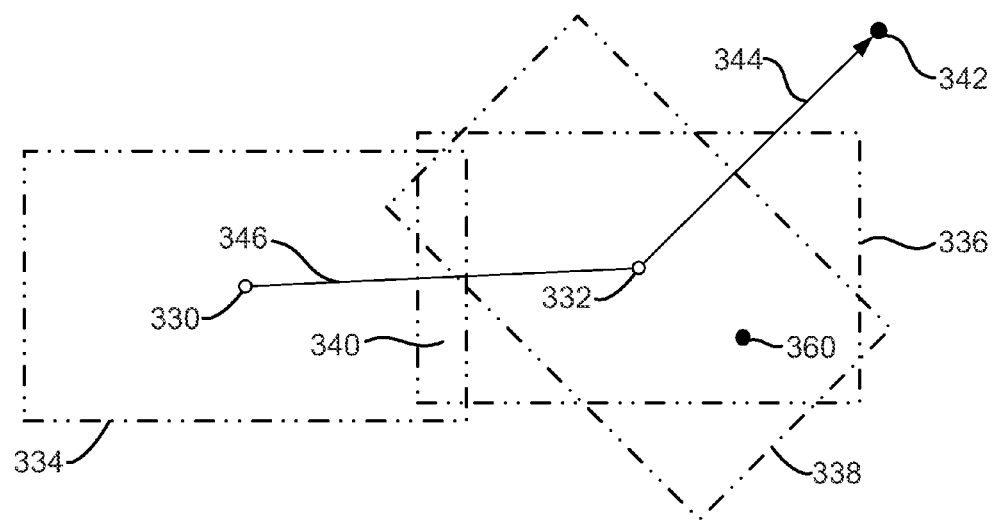
FIGS. 3A-3C are simplified diagrams illustrating measurement methods according to an embodiment of the present invention.
Figure 3B:
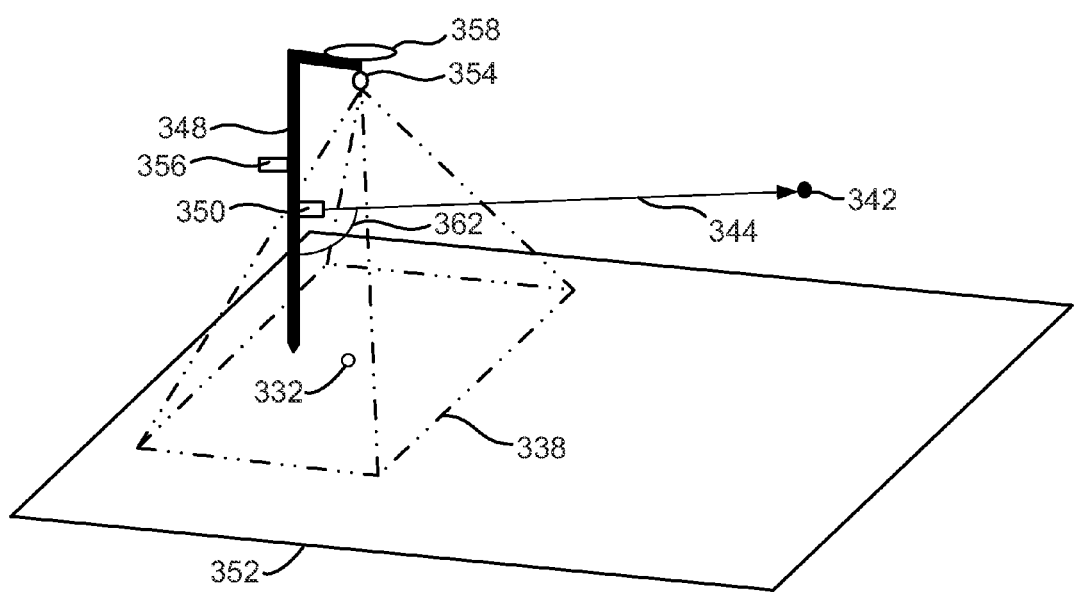

FIGS. 3A-3B are simplified diagrams illustrating measurement methods according to an embodiment of the present invention. The measurement methods may be used to determine angles and/or locations of target points.

FIG. 3A is a simplified plan view showing three images, or the FOV of three images, obtained using a measurement apparatus such as measurement apparatus 100, 200, 240, or 250 described above. In the embodiment illustrated in FIG. 3A, the measurement apparatus is positioned at a first location 330 and a first image having FOV 334 is obtained. The position of the first location 330 in the local coordinate frame is determined. For example, the position may be determined using a GNSS or total station as described above. The local coordinate frame may refer to a real world coordinate system or it may be in reference to a particular object or known point. The tilt sensor may be used in accordance with known techniques to determine the position of the imaging device, or the position of the optical center of the imaging device, in the local coordinate frame. The first location 330 may be the point of contact between the measurement apparatus and the surface, or the first location 330 may be a point on the surface that is aligned with or below the imaging device. In some embodiments, the position is determined and the image is captured concurrently.

The measurement apparatus is positioned at a second location 332 and a second image having FOV 336 is obtained. The position of the second location 332 in the local coordinate frame is determined as explained above. A baseline 346 from the first location 330 to the second location 332 is determined. Using common features in the overlapping portion 340 of the first and second images, the images can be oriented relative to the baseline 346 using known feature extraction techniques. For example, known computer vision algorithms such as SIFT (scale-invariant feature transform) or SURF (speeded up robust features) may be used. As an alternative to using common features in the overlapping portion 340 of the images, the images may be oriented with the baseline 346 by orienting the measurement apparatus with a known point when capturing the first and second images. Alternatively, the second image may be oriented relative to the baseline 346 by orienting the measurement apparatus with the first measurement position 330 when capturing the second image. Each of these methods provide a zero of the azimuth for angle measurements from the second position 332.

From the second location 332, the measurement apparatus is rotated and aligned, or oriented, with the target point 342 and a third image having FOV 338 is obtained. The measurement apparatus may be aligned using a laser pointer, an optical/mechanical sighting device, a graphic display using crosshairs, or other suitable means. The distance 344 from the second location 332 to the target point 342 is determined. The distance 344 may be determined using a distance measuring device as explained previously. A tilt sensor and vertical angle sensor may be used to determine the angle of the distance measuring device relative to the support structure.

The angle or azimuth of the target point 342 relative to the baseline 346 can be determined using the overlapping portions of the images 336, 338 and known computer vision techniques. For example, the relative orientation of the second and third images can be determined and used with the orientation of the second image relative to the baseline 346 to determine the azimuth.

The location or coordinates of the target point 342 in the local coordinate frame can be determined using known techniques. For example, using the first and second locations 330, 332, the images 334, 336, 338, and features in the overlapping portion 340 of the first and second images, the azimuth of the EDM beam extending from the second location 332 to the target point 342 can be calculated. Using known surveying techniques, the second location 332, the calculated azimuth and vertical angle, the magnitude and direction of the tilt, and the distance can be used to calculate the location of the target point 342 in the local coordinate frame.

The location or coordinates of the second target point 360 in the local coordinate frame can also be determined. For example, using the first and second locations 330, 332, the first and second images 334, 336, and at least two features in the overlapping portion 340 of the first and second images, the azimuth of the first and second images 334, 336 in the local coordinate frame can be calculated. The location of target point 360 in the image can be calculated assuming the target point 342 is on a geometric primitive such as a plane and the relation of the plane to the location 332 is known. The relation can be expressed as the height of the location 332 above the plane and the slope and orientation vectors of the plane. For example, if the plane is leveled with respect to gravity, the height may be the distance from the tip of the support structure to the origin of the support structure coordinate frame. The location of target point 360 can be calculated by projecting the image 336 onto the plane and using the calibration data of the imaging device.

FIG. 3B is a simplified perspective view showing the measurement apparatus at the second location 332 illustrated in FIG. 3A. FIGS. 3A and 3B include several common features such as second location 332, FOV 338, distance 344, and target point 342. As shown in FIG. 3B, the measurement apparatus is aligned with target point 342, and the FOV 338 corresponds to the area included in the third image described above with regard to FIG. 3A. Also shown in FIG. 3B is support structure 348 with imaging device 354, position measuring device 358, tilt sensor 356, and distance measuring device 350. As shown in FIG. 3B, the second location 332 is determined relative to the imaging device 354 in this embodiment. FIG. 3B also illustrates the vertical angle 362 of the distance measuring device 350. The location or coordinates of target point 342 in the local coordinate frame can be determined as explained previously. Using these methods, the locations of points located anywhere (both within the images and remote to the images) can be determined using the EDM.

Figure 3C:
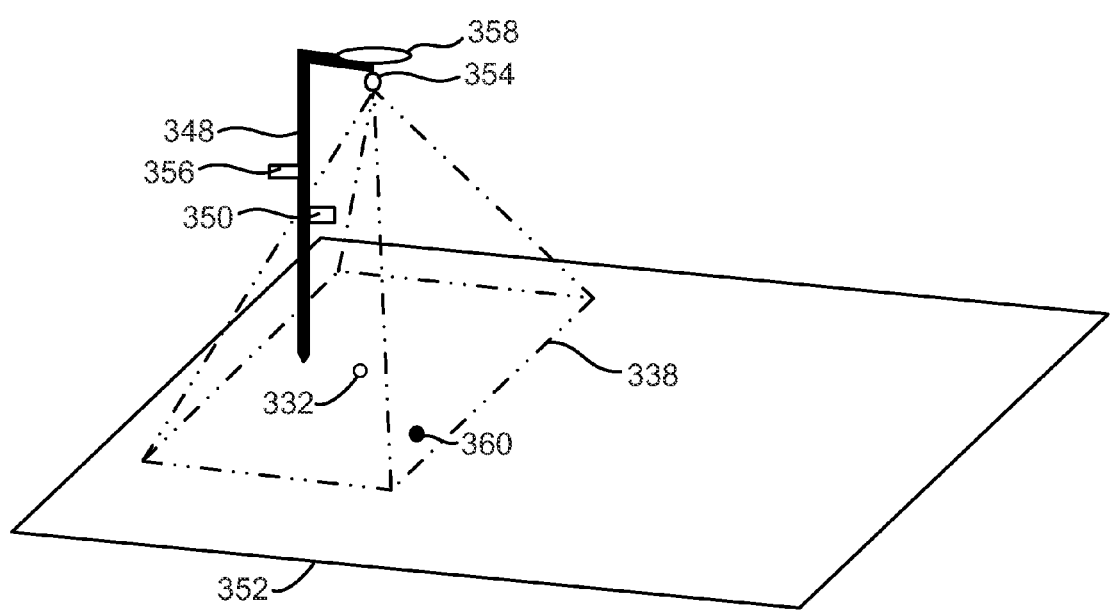

FIG. 3C is a simplified perspective view also showing the measurement apparatus at the second location 332 illustrated in FIG. 3A. FIG. 3C shows the second target point 360 within FOV 338 of the imaging device 354. With the FOV 338 projected onto a substantially flat surface 352, the location of the second target point 360 on the surface can be determined as explained previously. Substantially flat surface 352 may be a flat surface or a surface that is suitable for the computations described herein. As an example, the substantially flat surface 352 may be a road or parking lot. Some embodiments of the present invention allow angles and/or locations of points to be measured without having to physically visit a site. This is particularly advantageous when the when the points are difficult or dangerous to access (e.g., a road or construction site).

Table 1 below provides an example of how the height of the imaging device above the substantially flat surface and the calibration of the imaging device can be used to determine the positions of points within the images. A mapping can be determined using the size of the image sensor array in sensor elements or pixels, the FOV of the imaging device, and the height of the imaging device above the surface being imaged. The height of the imaging device above the surface can be determined in accordance with known techniques by aligning the measurement apparatus with the local gravity vector or by using the tilt sensor to determine the magnitude and direction of tilt. In this example, the imaging device has a two megapixel array of sensor elements (1600×1200) positioned two meters above the surface being imaged. The two-dimensional array is arbitrarily associated with x and y coordinates, with the x-direction associated with the length of the array (1600 sensor elements long) and the y-direction associated with the width of the array (1200 sensor elements wide). The FOV of the imaging device along the x-direction is 145°, and the FOV along the y-direction is 135°.

TABLE 1

| | |
|---|---|
| FOV Distance (x-direction) | 12.7 meters |
| FOV Distance (y-direction) | 9.7 meters |
| Mapping (x-direction) | 0.008 meters/image pixel |
| Mapping (y-direction) | 0.008 meters/image pixel |

As shown in Table 1, each image pixel corresponds to an area of the surface that is approximately 0.008 meters long by 0.008 meters wide. The location or coordinates of points on the surface can be determined using these values as explained previously. For example, in FIG. 3C the coordinates of the second target point 360 can be determined using a mapping as illustrated in Table 1 above and as explained previously. In other embodiments, a number of overlapping images, such as the first, second, and third images illustrated in FIG. 3A, can be mosaicked or stitched together using known computer vision techniques to allow the location of points on the surface within any of the images to be determined.

Figure 4:
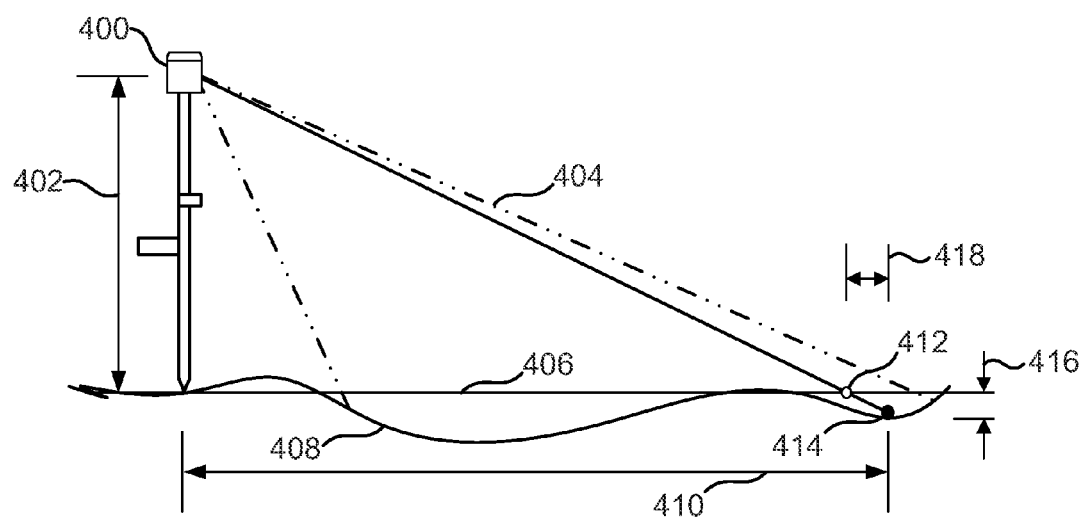
FIG. 4 is a simplified diagram illustrating the measurement error introduced by an uneven surface when determining the locations of points within the images.

FIG. 4 is a simplified diagram illustrating the measurement error introduced by an uneven surface when determining the locations of points within the images. As explained above, the example illustrated in FIG. 3C assumes the surface 352 is substantially flat. As illustrated in FIG. 4, an uneven surface can introduce measurement error when determining the locations of points within the images. FIG. 4 shows a measurement apparatus 400 positioned on a surface 408. The measurement apparatus 400 has an imaging device with a FOV 404. An optical center of the imaging device is positioned a height 402 above the surface 408, and a target point 414 is located a distance 410 from the measurement apparatus 400. Due to the uneven surface 408, the target point 414 is below an ideal or flat surface 406 where the image is projected by an amount 416. From the perspective of the imaging device, the target point 414 appears to be located at point 412 on the ideal or flat surface 406. As shown in FIG. 4, a measurement error 418 is introduced by the uneven surface 408. The magnitude of the measurement error 418 can be determined in accordance with known techniques.

In an embodiment the measurement error is reduced by dividing or digitizing the surface into a number of sections. For example, a curved surface can be approximated (digitized) by triangular flat surfaces. At each corner a location of the position measuring device and an image can be stored. The image can be projected as a skin on the triangles. Positions within each triangle can be determined as described above.

Figure 5A:
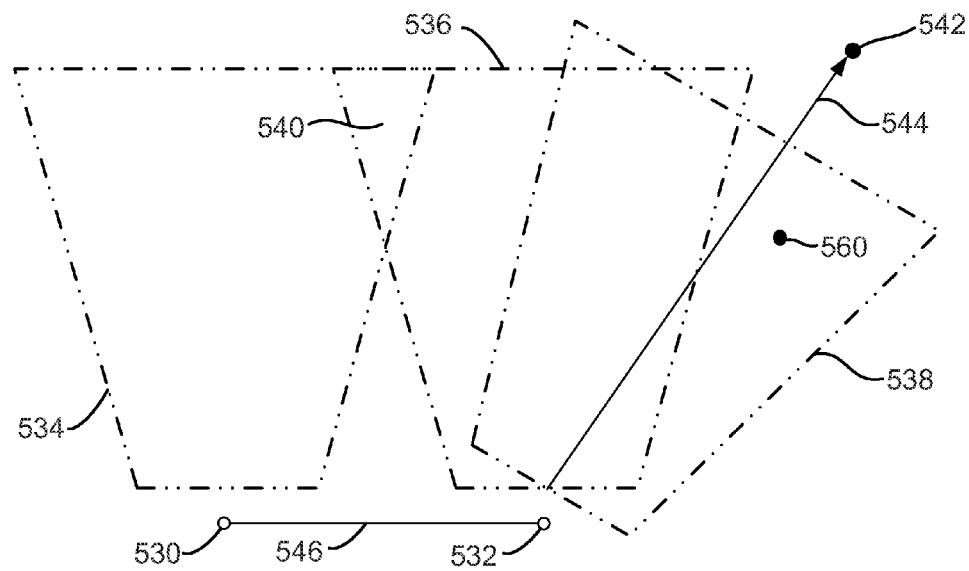
FIGS. 5A-5C are simplified diagrams illustrating measurement methods according to another embodiment of the present invention.
Figure 5B:
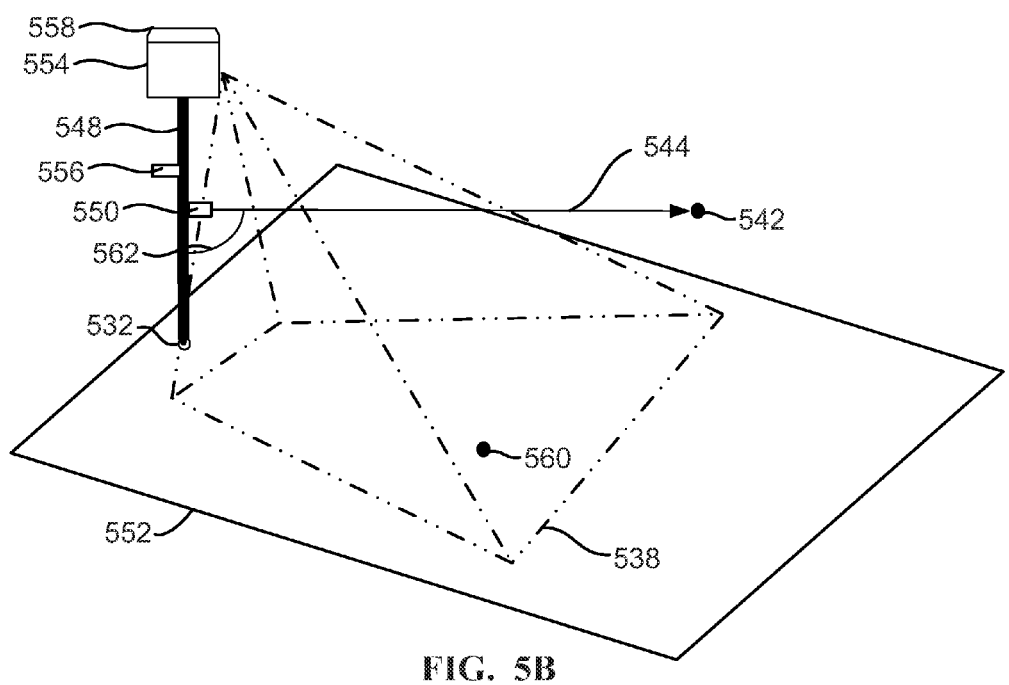
Figure 5C:
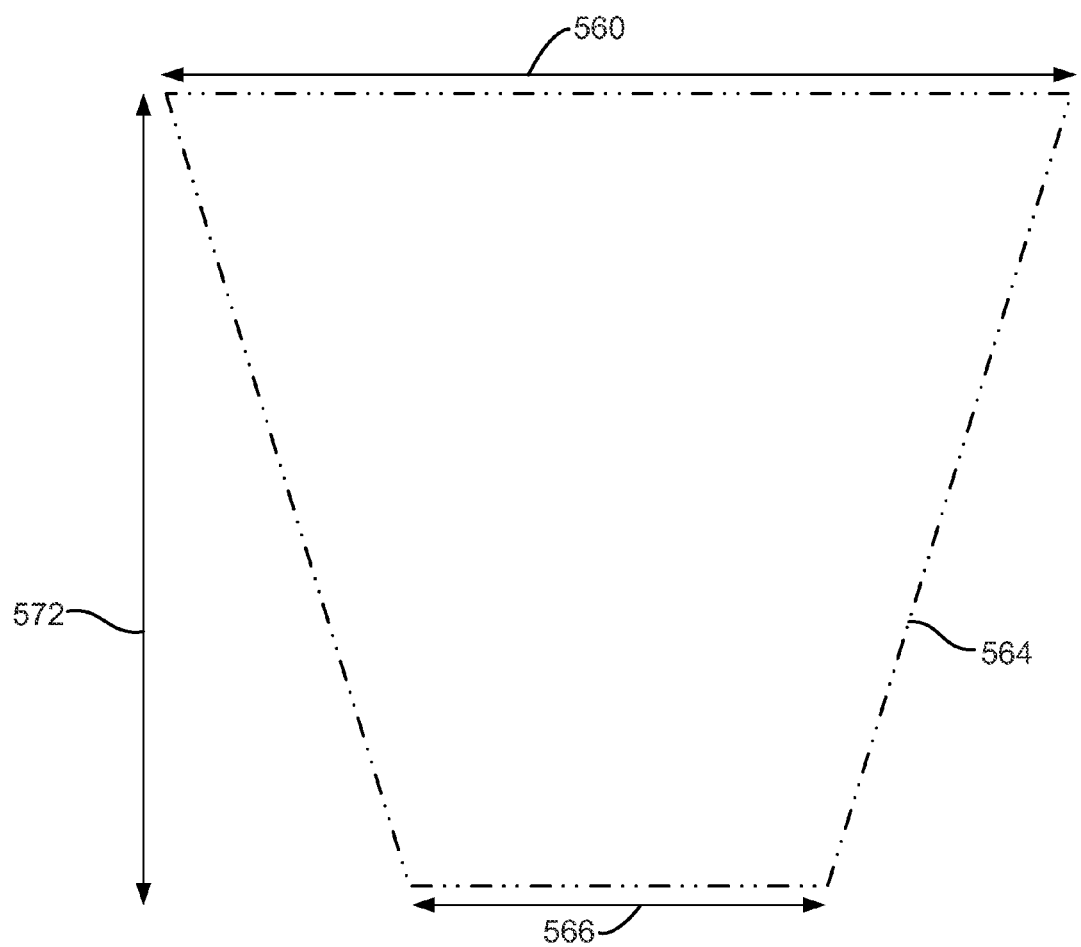

FIGS. 5A-5C are simplified diagrams illustrating measurement methods according to another embodiment of the present invention. FIG. 5A is a simplified plan view showing three images, or the FOV of three images, obtained using a measurement apparatus as described above. In the embodiment illustrated in FIG. 5A, the measurement apparatus is positioned at a first location 530 and a first image having FOV 534 is obtained. The position of the first location 530 in the local coordinate system is determined. For example, the position of the first location 530 in the local coordinate system may be determined using a GNSS or total station as described above. The local coordinate system may refer to a real world coordinate frame or it may be in reference to a particular known position or object. The tilt sensor may be used in accordance with known techniques to determine the position of the imaging device, or the position of the optical center of the imaging device, in the local coordinate frame. The first location 530 may be the point of contact between the measurement apparatus and the surface, or the first location 530 may be a point on the surface that is aligned with or below the imaging device. In FIG. 5A, the FOV of the images is generally forward and downward and does not include the first location 530.

The measurement apparatus is positioned at a second location 532 and a second image having FOV 536 is obtained. The position of the second location 532 in the local coordinate system is determined as explained above. A baseline 546 from the first location 530 to the second location 532 is determined. The images can be oriented relative to the baseline 546 as explained above. From the second location 532, the measurement apparatus is rotated and aligned, or oriented, with the target point 542 and a third image having FOV 538 is obtained. The distance 544 from the second location 532 to the target point 542 is determined using a distance measuring device as explained previously. A tilt sensor and vertical angle sensor may be used to determine the angle of the distance measuring device relative to the local gravity vector. The angle or azimuth of the target point 542 as well as the location or coordinates of the target point 542 in the local coordinate frame can be determined as explained previously. The location or coordinates of the second target point 560 can also be determined as explained above.

FIG. 5B is a simplified perspective view showing the measurement apparatus at the second location 532 illustrated in FIG. 5A. FIGS. 5A and 5B include several common features such as second location 532, FOV 538, distance 544, and target point 542. As shown in FIG. 5B, the measurement apparatus is aligned with target point 542, and FOV 538 corresponds to the area included in the third image described above with regard to FIG. 5A. Also shown in FIG. 5B is support structure 548 with imaging device 554, position measuring device 558, tilt sensor 556, and distance measuring device 550. As shown in FIG. 5B, the second location 532 is aligned with the support structure 548 in this embodiment. FIG. 5B also illustrates the vertical angle 562 of the distance measuring device 550. The location or coordinates of target point 542 in the local coordinate frame can be determined as explained previously. Using these methods, the locations of points located anywhere (both within the images and remote to the images) can be determined using the EDM.

With the FOV projected onto a substantially flat surface 552, the location of to the second target point 560 can be determined as explained above. FIG. 5C is a simplified plan view illustrating a mapping of image pixels obtained using a FOV similar to FOV 538 illustrated in FIGS. 5A-5B. The mapping can be determined using the size of the image sensor array in sensor elements or pixels, the FOV of the imaging device, and the height and orientation of the imaging device above the surface being imaged. The height of the imaging device above the surface can be determined in accordance with known techniques by aligning the measurement apparatus with the local gravity vector or by using the tilt sensor to determine the magnitude and direction of tilt. In this example, a camera having a two megapixel array of sensor elements (1600×1200) is positioned two meters above the surface being imaged. For this example, the two-dimensional array is arbitrarily associated with x and y coordinates, with the x-direction associated with the length of the array (1600 sensor elements long) and the y-direction associated with the width of the array (1200 sensor elements wide). In this example, the camera is oriented downwards 38° from horizontal. Using the above values, the width 560 is determined to be nine meters, the length 572 is determined to be 8 meters, and the width 566 is determined to be 2.8 meters. The mapping along the width 560 is determined to be approximately 0.0076 meters/image pixel, and the mapping along the width 566 is determined to be approximately 0.002 meters/image pixel. One of ordinary skill in the art would recognize many variations, modifications, and alternatives to the above examples.

Figure 6:
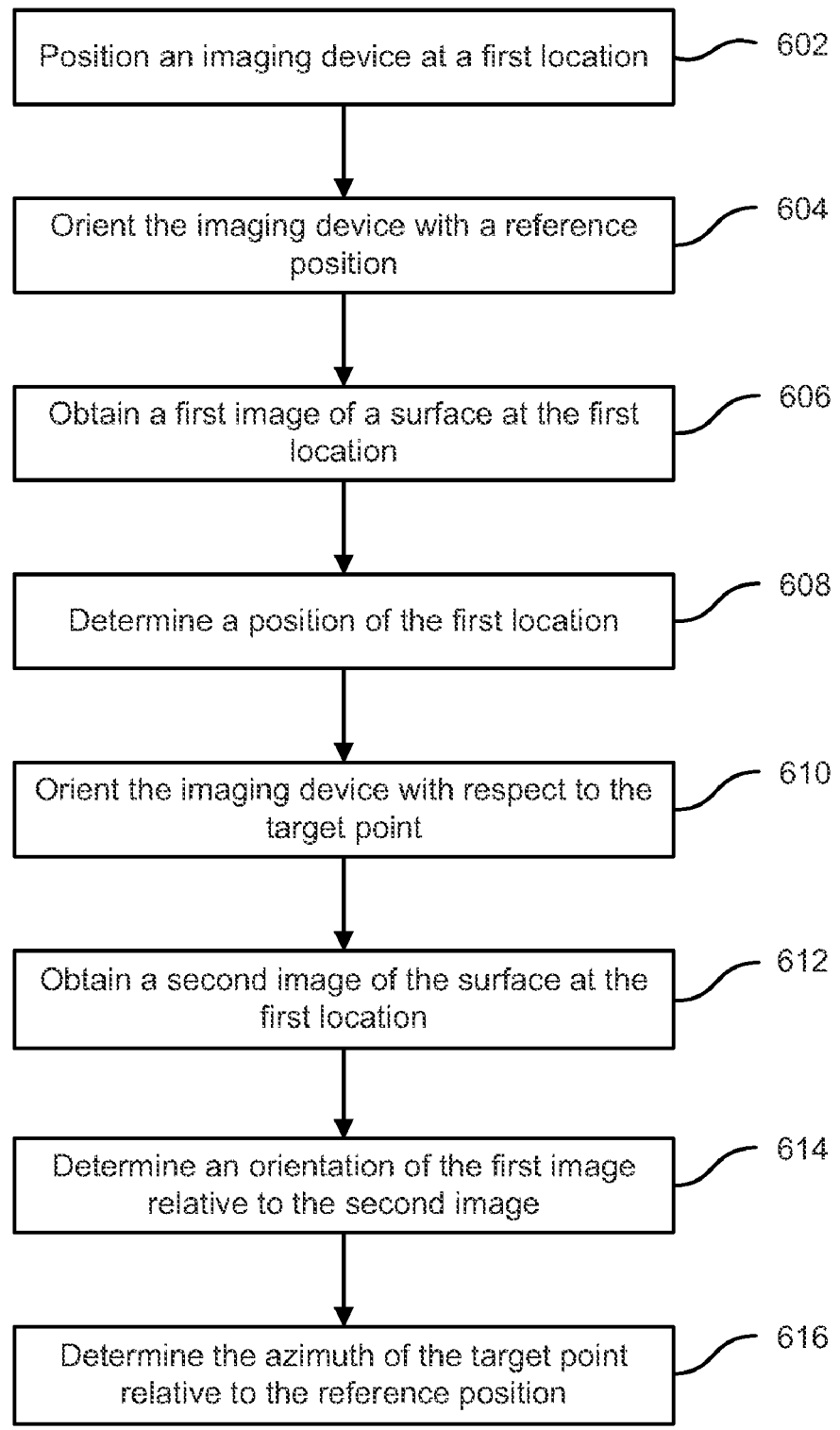
FIG. 6 is a simplified flowchart illustrating a method of determining a location of a target point according to an embodiment of the present invention.

FIG. 6 is a simplified flowchart illustrating a method of determining an azimuth of a target point according to an embodiment of the present invention. The method includes positioning an imaging device at a first location (602). The imaging device is oriented with a reference position (604). The reference position may comprise a baseline extending from the first location to a second location. The first image may be oriented with the reference position using overlapping portions of the first image obtained from the first location and an image obtained from the second location. Alternatively, the first image may be oriented with the reference position by orienting the measurement apparatus with a known point when capturing the first image. The known point has coordinates in the local coordinate frame that are known or can be determined. As an example, the known point may be the second location.

A first image of a surface is obtained at the first location (606). The first image may include the area of the surface surrounding the first location, or it may include an area of the surface that is outward or away from the first location. To determine the azimuth, images of any surface may be utilized provided that rotation between the images can be determined using overlapping portions of the images. Similarly, to determine locations of points using distance and vertical orientation of the measuring device, images of any surface may be utilized provided that rotation between the images can be determined using overlapping portions of the images. If coordinates of points on the surface will be determined, the surface may be a substantially flat surface or it may be digitized as explained previously to reduce measurement error. A position of the first location is determined (608). In some embodiments the position is determined, for example, using a GNSS or total station as described above. The position may be determined in the local coordinate frame or another coordinate system defined relative to a particular position or object.

The imaging device is oriented or aligned with the target point (610). The imaging device may be oriented or aligned with the target point using a laser pointer, an optical/mechanical sighting device, a graphic display with crosshairs, or other suitable means. A second image of the surface is obtained at the first location (612). A portion of the second image overlaps a portion of the first image. An orientation of the first image relative to the second image is determined (614). The orientation is the rotation of the imaging device about a vertical axis between the first image and the second image. The vertical axis is an axis aligned with the local gravity vector. In one embodiment, the orientation is determined using the overlapping portions of the images and known computer vision techniques. The azimuth of the target point relative to the reference position is determined (616). The azimuth may be determined using the orientation between the first and second images and the orientation of the first image with the reference position.

Figure 7:
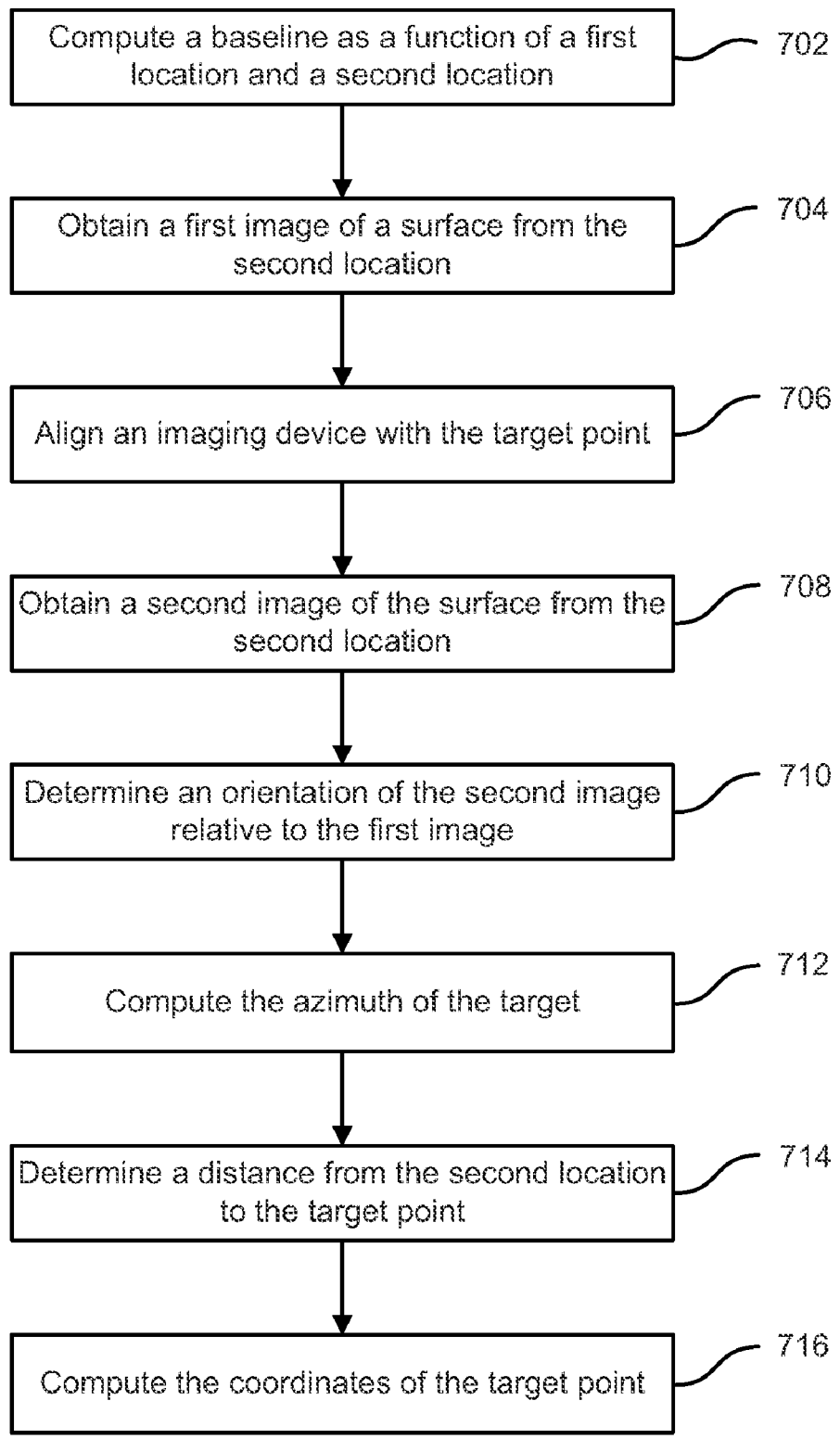
FIG. 7 is a simplified flowchart illustrating a method of determining a location of a target point according to another embodiment of the present invention.

FIG. 7 is a simplified flowchart illustrating a method of determining a location of a target point according to another embodiment of the present invention. The method includes computing a baseline (702). The baseline may be computed as a function of a first location and a second location. In some embodiments, the positions of the first and second locations are determined using a GNSS or total station as discussed above. In other embodiments, the baseline may be determined relative to true north in the local coordinate frame using a compass or other suitable device. A first image of a surface is obtained from the second location (704). The first image may be oriented with the baseline. An imaging device is aligned with the target point (706). A second image of the surface is obtained with the imaging device aligned with the target point (708). An orientation of the first image relative to the second image is determined (710). The orientation may be determined using overlapping portions of the images. The azimuth of the target point is computed (712). The azimuth may be based on the orientation of the first image relative to the second image and the orientation of the first image relative to the baseline. A distance from the second location to the target point is determined (714). The distance may be determined using an EDM as explained previously. The coordinates of the target point in the local coordinate frame are computed (716). The coordinates may be computed using the methods described above.

It should be appreciated that the specific steps illustrated in FIGS. 6-7 provide particular methods of determining an azimuth of a target point according to embodiments of the present invention. Other sequences of steps may also be performed according to alternative embodiments. For example, alternative embodiments of the present invention may perform the steps outlined above in a different order. Moreover, the individual steps illustrated in FIGS. 6-7 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 8:
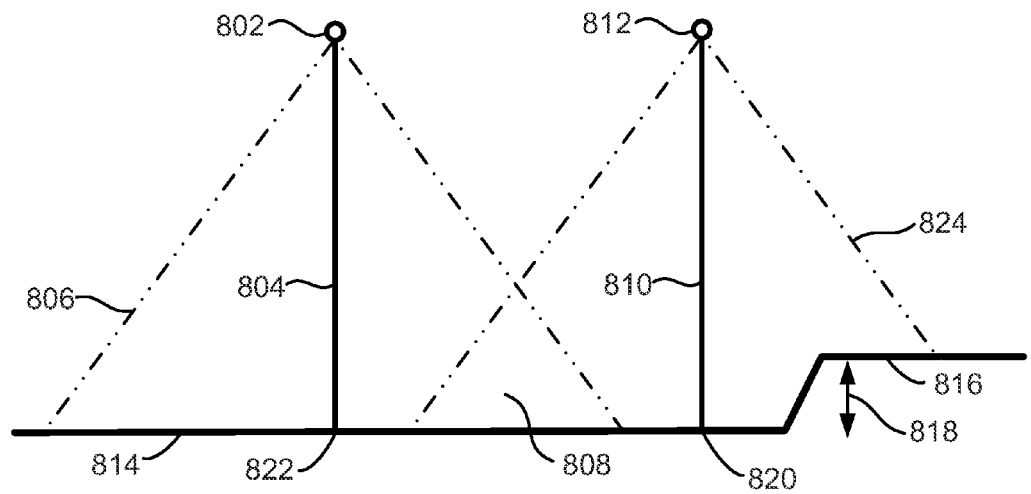
FIG. 8 is a simplified side view illustrating measurement methods according to an embodiment of the present invention.

FIG. 8 is a simplified diagram illustrating measurement methods according to an embodiment of the present invention. FIG. 8 shows a first measurement apparatus including an imaging device 802 and support structure 804 at a first location 822, and a second measurement apparatus including an imaging device 812 and a support structure 810 at a second location 820. A single measurement apparatus may be used to obtain images from both the first location 822 and the second location 820. Portions 808 of the images overlap. FOV 806 is projected entirely onto a first surface 814, and FOV 824 is projected onto both the first surface 814 and a second surface 816. The elevations of first surface 814 and second surface 816 are different by a height 818.

According to an embodiment of the present invention, the positions of target points on both the first surface 814 and the second surface 816 can be determined. To determine the positions of target points within the images, a first mapping is determined using the image pixels that include the first surface 814. The mapping may be determined in a manner similar to that described with regard to FIGS. 3A, 3C, and 5A-5C above. A second mapping is determined using the image pixels that include the second surface 816 taking into consideration the difference in height and parallelity between the second surface 816 and the first surface 814. Using the mappings, the positions of target points within the images on both the first surface 814 and the second surface 816 can be determined.

Figure 9:
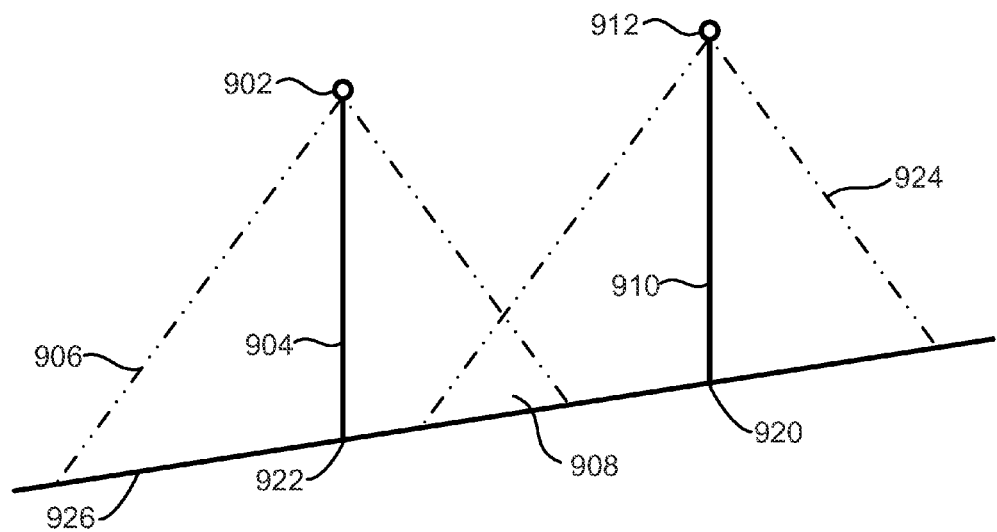
FIG. 9 is a simplified side view illustrating measurement methods according to another embodiment of the present invention.

FIG. 9 is a simplified diagram illustrating measurement methods according to an embodiment of the present invention. FIG. 9 shows a first measurement apparatus including an imaging device 902 and a support structure 904 at a first location 922, and a second measurement apparatus including an imaging device 912 and a support structure 910 at a second location 920. A single measurement apparatus may be used to obtain images from both the first location 922 and the second location 920. Portions 908 of the images overlap. The FOV at both locations is projected onto a sloping surface 926.

According to an embodiment of the present invention, the positions of target points on surface 926 can be determined. To determine the positions of target points within the images, the slope of surface 926 is determined using the positions of first location 922 and second location 920. If the slope is not constant over the surface 926, approximately flat portions of the surface 926 can be segmented or digitized and the positions of three locations determined for each segment. Multiple mappings can determined depending on the height of the imaging device above each particular segment of the surface 926. To determine the three-dimensional slope of the surface 926, a position of a third location can be determined. Using the slope of the surface 926, a mapping can be determined using known techniques. The positions of target points within the images can be determined using the mappings as described previously.

Figure 10:
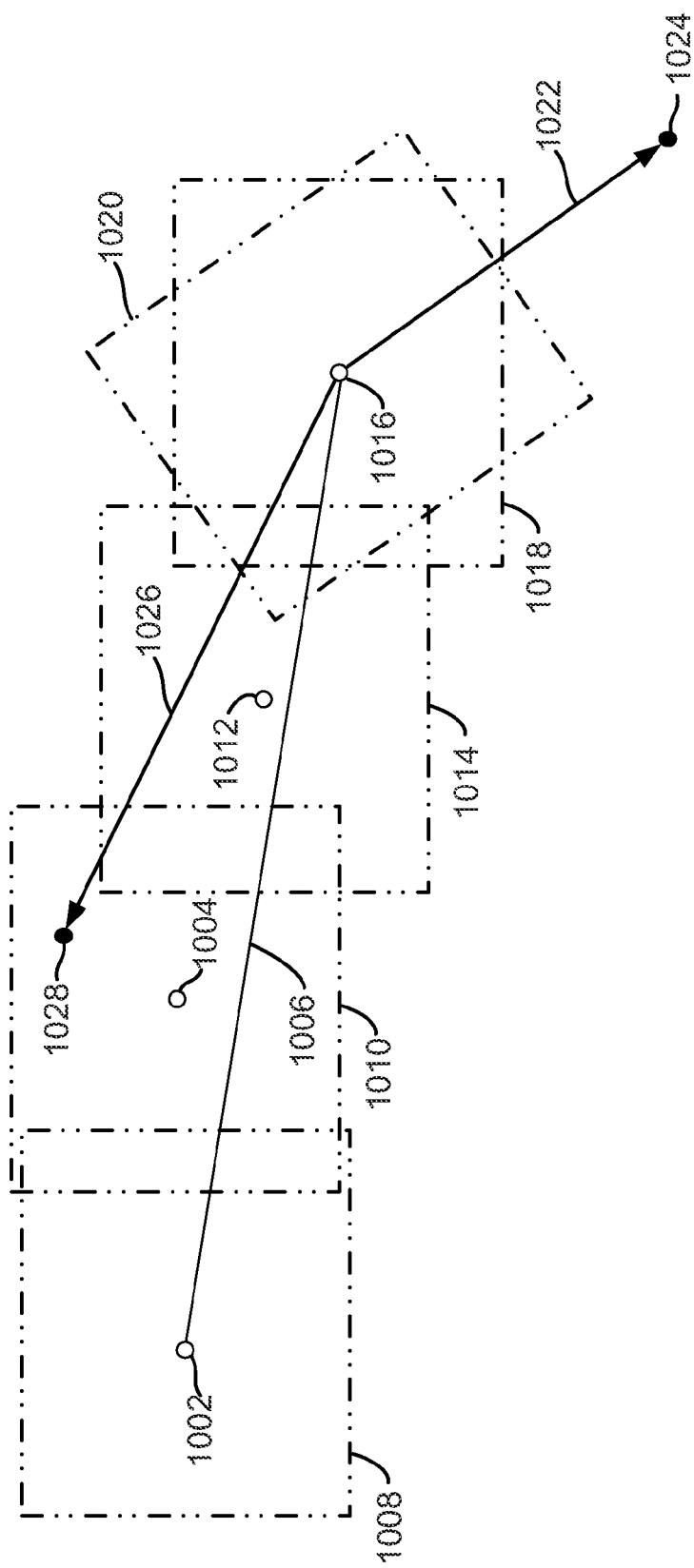
FIG. 10 is a simplified plan view illustrating measurement methods according to an embodiment of the present invention.

FIG. 10 is a simplified plan view illustrating measurement methods according to an embodiment of the present invention. FIG. 10 shows five images, or the FOV of five images, obtained using a measurement apparatus as described above. In the embodiment illustrated in FIG. 10, the measurement apparatus is positioned at a first location 1002 and a first image having FOV 1008 is obtained. The position of the first location 1002 can be determined using the methods described above. The measurement apparatus is positioned at a second location 1004 and a second image having FOV 1010 is obtained. In the example illustrated, the position of the second location 1004 is not determined. For example, the second location 1004 may not be able to receive GPS signals due to overhead objects or the second location 1004 may be out of view of a total station.

The measurement apparatus is positioned at a third location 1012 and a third image having FOV 1014 is obtained. Similar to the second location 1004, the position of the third location 1012 is not determined. The measurement apparatus is positioned at a fourth location 1016 and a fourth image having FOV 1014 is obtained. The position of the fourth location 1016 can be determined, and a baseline 1006 can be determined using the positions of the first location 1002 and the fourth location 1016.

In the embodiment illustrated in FIG. 10, the positions of target points 1028 and 1024 in the local coordinate frame can be determined. The position of target point 1028 is within the second image and is located on the substantially flat surface being imaged. The position of target point 1028 can be determined using a mapping of the image pixels as described previously. The overlapping portions of the images can be used to stitch or mosaic the images so that the position can be determined in the local coordinate system using the known positions of the first location 1002 and/or the fourth location 1016 and the mappings of each image. In another embodiment, the position of target point 1028 can be determined using distance measurements from the fourth location 1016 and the orientation of the fourth image relative to the baseline 1006. No assumptions on the surface needed if the EDM is used.

The position of the remote target point 1024 can be determined by aligning the measurement device with the target point 1024 and obtaining a fifth image (illustrated as FOV 1020 in FIG. 10). The distance between fourth location 1016 and the remote target point 1024 can be determined, for example, using a distance measuring device. The coordinates of the remote target point 1024 in the local coordinate frame can be determined using the relative orientations of the fourth and fifth images, the distance between the fourth location 1016 and the target point 1024, and the orientation of the fourth image relative to the baseline 1006. One of ordinary skill in the art would recognize many variations, modifications, and alternatives to the measurement method illustrated in FIG. 10. For example, the baseline may be determined between any two images, and is not limited to the first and last image as illustrated in this example. Furthermore, the distance between images may be reduced to limit the perspective difference between adjacent images.

Figure 11:
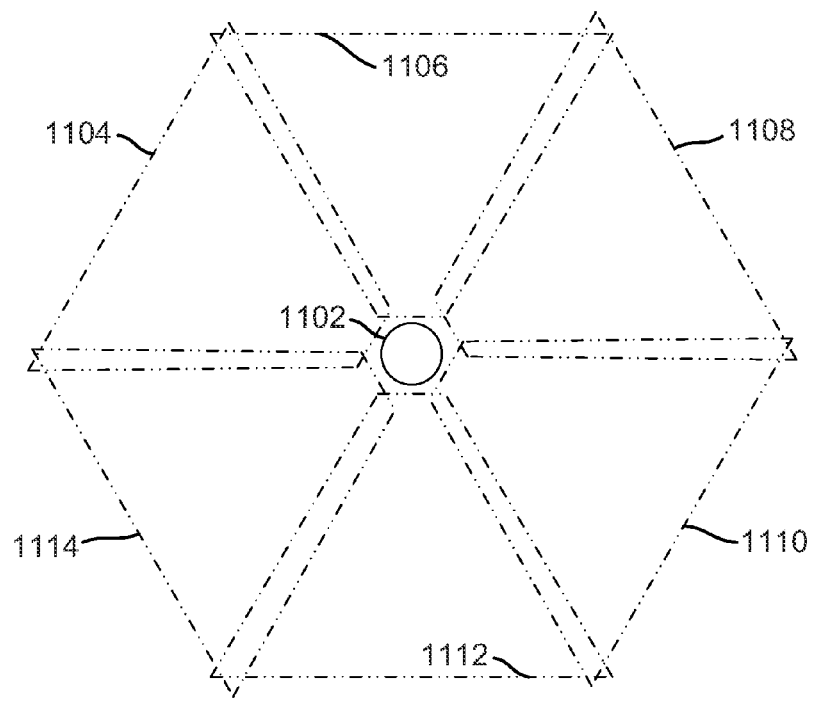
FIG. 11 is a simplified top view of an apparatus for determining angles and/or locations of target points according to another embodiment of the present invention.

FIG. 11 is a simplified plan view of an apparatus for determining angles and/or locations of target points according to another embodiment of the present invention. FIG. 11 shows a measurement apparatus 1102 having a plurality of imaging devices such that a plurality of overlapping images are obtained. In this example the overlapping images form a 360° horizontal panoramic image. The measurement apparatus 1102 has six imaging devices. More or fewer imaging devices can be used in accordance with embodiments of the invention. A first imaging device has FOV 1104, a second imaging device has FOV 1106, a third imaging device has FOV 1108, a fourth imaging device has FOV 1110, a fifth imaging device has FOV 1112, and a sixth imaging device has FOV 1114. Alternatively, a measurement apparatus with a single imaging device may be used to take multiple overlapping images to form the 360° panoramic image. The overlapping images can be stitched or mosaicked together using known computer vision techniques, enabling a mapping of the 360° panoramic image to be determined. The mapping can be used to determine coordinates of target points on the surface being imaged using methods described previously. Measurement apparatus 1102 can also be used to determine azimuths of target points located within or outside of the images as explained previously.

Figure 12:
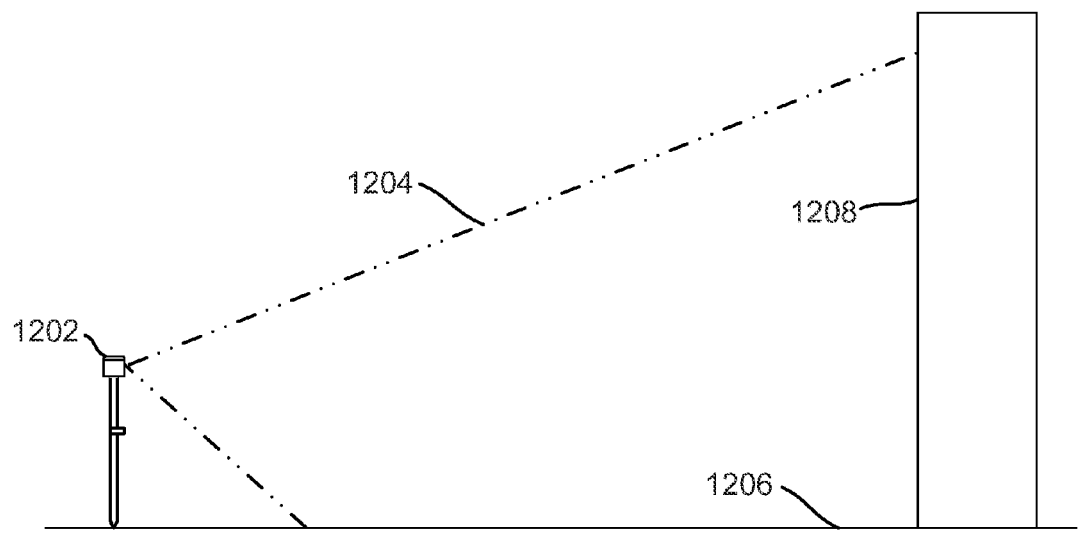
FIG. 12 is a simplified side view illustrating a measurement method according to another embodiment of the invention.

FIG. 12 is a simplified diagram illustrating a measurement method according to another embodiment of the invention. FIG. 12 includes a measurement apparatus 1202 having an imaging device with FOV 1204. In this example two surfaces are within the FOV 1204 of the imaging device—horizontal surface 1206 and vertical surface 1208. The horizontal surface 1206 may be, for example, the ground and the vertical surface may be a side of a building or structure. A mapping of each surface can be determined. The mapping of the horizontal surface 1206 is based on the height of the imaging device above the surface. The mapping of the vertical surface 1208 is based on the distance of the imaging device from the surface. This distance can be obtained, for example, using the EDM. One of ordinary skill in the art would recognize many variations, modifications, and alternatives.

It is to be understood that the features of one or more embodiments of the invention may be combined with one or more features of other embodiments of the invention without departing from the scope of the invention. Also, the examples and embodiments described herein are for illustrative purposes only, and various modifications or changes in light thereof will be suggested to persons skilled in the art and are to be included within the spirit and purview of this application and scope of the appended claims.

What is claimed is:

1. An apparatus for determining an azimuth of a target point comprising:
    a support structure;
    an imaging device coupled to the support structure and configured to provide image data;

a position measuring device coupled to the support structure and configured to determine position information; and a processor in electrical communication with the imaging device and the position measuring device, wherein the processor is configured to:
receive the image data from the imaging device;
receive the position information from the position measuring device;
determine a baseline between a first position and a second position;
determine an orientation between overlapping images; and
compute the azimuth of the target point, the azimuth being an angle between the baseline and a line extending from either the first position or the second position to the target point.

2. The apparatus of claim 1 further comprising:
a tilt sensor configured to determine a vertical alignment of the support structure relative to a local gravity vector.

3. The apparatus of claim 2 further comprising:
a distance measuring device coupled to the support structure; and
a vertical angle sensor coupled to the support structure and configured to determine a vertical angle of the distance measuring device relative to the support structure, wherein the distance measuring device and the vertical angle sensor are in electrical communication with the processor, and wherein the processor is further configured to:
receive distance information from the distance measuring device;
receive angle information from the vertical angle sensor; and
compute coordinates of the target point in a local coordinate frame.

4. The apparatus of claim 1 wherein the position measuring device includes a reflective target.

5. The apparatus of claim 1 wherein the imaging device is calibrated to provide angular relationships between elements of the image data.

6. The apparatus of claim 1 wherein the position measuring device includes a global navigation satellite system.

7. The apparatus of claim 1 wherein the imaging device comprises a digital camera.

8. The apparatus of claim 1 wherein the support structure comprises a pole having a vertical axis extending along a length of the pole, and wherein an optical center of the imaging device is aligned with the vertical axis of the pole.

9. A method of determining an azimuth of a target point, the method comprising:
at a first location:
positioning an imaging device at the first location;
orienting the imaging device with respect to a reference position having known coordinates in a local coordinate frame;
obtaining a first image of a surface from the first location;
determining a position of the first location;
orienting the imaging device with respect to the target point; and
obtaining a second image of the surface from the first location, wherein a portion of the first image overlaps a portion of the second image;
determining an orientation of the first image relative to the second image; and determining the azimuth of the target point relative to the reference position.

10. The method of claim 9 further comprising:
determining a distance from the first location to the target point; and
computing coordinates of the target point in the local coordinate frame.

11. The method of claim 9 further comprising obtaining a third image from a second location, wherein the reference position comprises a baseline extending from the first location to the second location, and wherein the first image is oriented with respect to the reference position using overlapping portions of the first image obtained from the first location and the third image obtained from the second location.

12. The method of claim 9 wherein a second target point is located within the second image and the surface is substantially flat, the method further comprising:
computing coordinates of the second target point in the local coordinate frame using a calibration of the imaging device.

13. A method of determining coordinates of a target point in a local coordinate frame, the method comprising:
computing a baseline as a function of a first location and a second location;
obtaining a first image of a surface from the second location using an imaging device;
orienting the first image relative to the baseline;
aligning the imaging device with the target point;
obtaining a second image of the surface from the second location with the imaging device aligned with the target point;
determining an orientation of the second image relative to the first image;
computing the azimuth of the target point;
determining a distance from the second location to the target point; and
computing the coordinates of the target point in the local coordinate frame.

14. The method of claim 13 further comprising obtaining a third image from the first position, wherein the first image is oriented relative to the baseline using overlapping portions of the first image and the third image.

15. The method of claim 13 further comprising:
determining a first position of the first location in the local coordinate frame; and
determining a second position of the second location in the local coordinate frame.

16. A method of determining coordinates in a local coordinate frame of a target point on a substantially flat surface, the method comprising:
obtaining a first image of a surface from a first location using a calibrated imaging device that includes angular relationships between elements of image data;
determining a position of the first location in the local coordinate frame;
obtaining a second image of the substantially flat surface from a second location using the calibrated imaging device, the second image including the target point, wherein the first location is different from the second location and a portion of the first image overlaps a portion of the second image;
determining a position of the second location in the local coordinate frame;
computing an azimuth of the second image; and
computing the coordinates of the target point in the local coordinate frame.

17. The method of claim 16 wherein the azimuth of the second image is computed using the position of the first location in the local coordinate frame, the position of the second location in the local coordinate frame, and features in the portion of the first image that overlaps the portion of the second image.

18. The method of claim 16 wherein the location of the target point in the local coordinate frame is computed using calibration of the imaging device and the azimuth of the second image.

19. The method of claim 16 wherein the substantially flat surface is characterized by a slope, the method further comprising:
- determining a position of a third location in the local coordinate system;
- computing the slope of the surface; and
- determining the coordinates of the target point on the substantially flat surface based on the slope.

* * * * *